E. SEUBERT.
SEWAGE TANK FOR THE PURIFICATION OF SEWAGE.
APPLICATION FILED NOV. 11, 1912.
1,102,553.
Patented July 7, 1914.
2 SHEETS—SHEET 1.
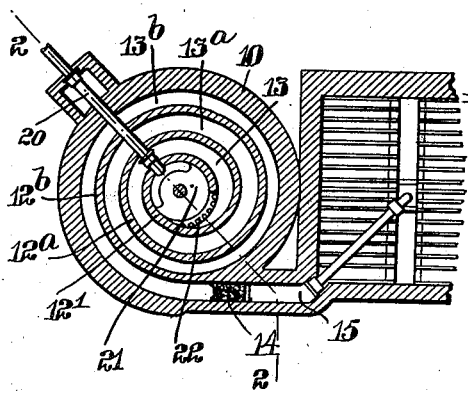
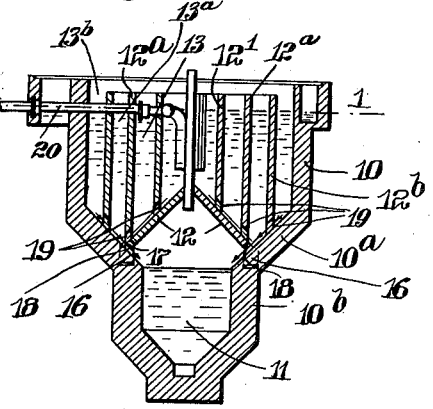
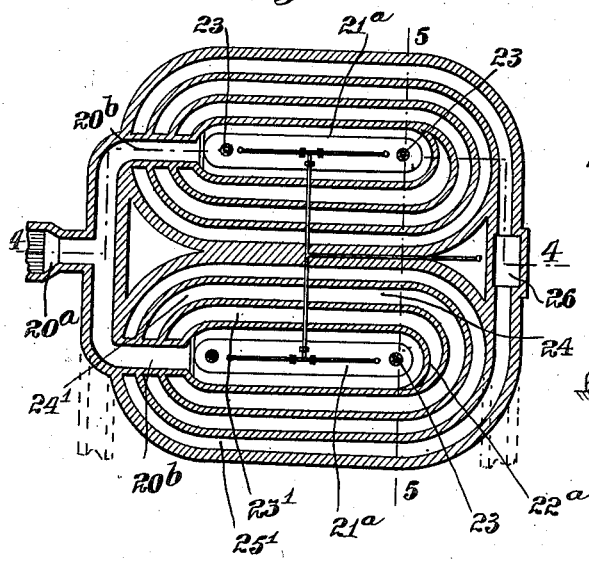
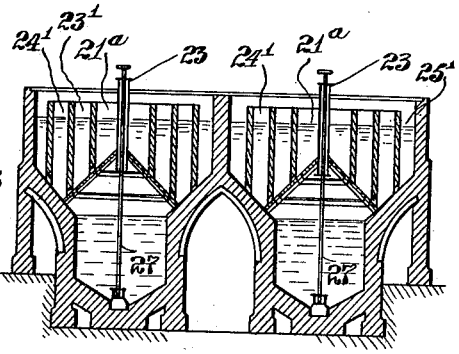
Attest:
Inventor:
Eugen Seubert
by
his Atty E. SEUBERT.
SEWAGE TANK FOR THE PURIFICATION OF SEWAGE.
APPLICATION FILED NOV. 11, 1912.
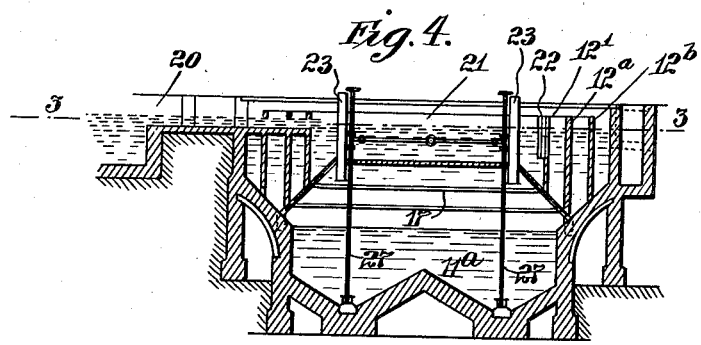
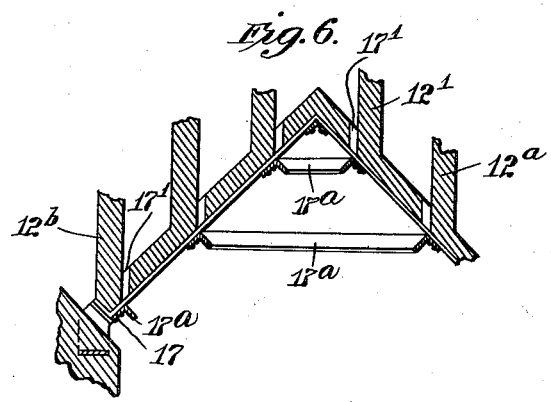
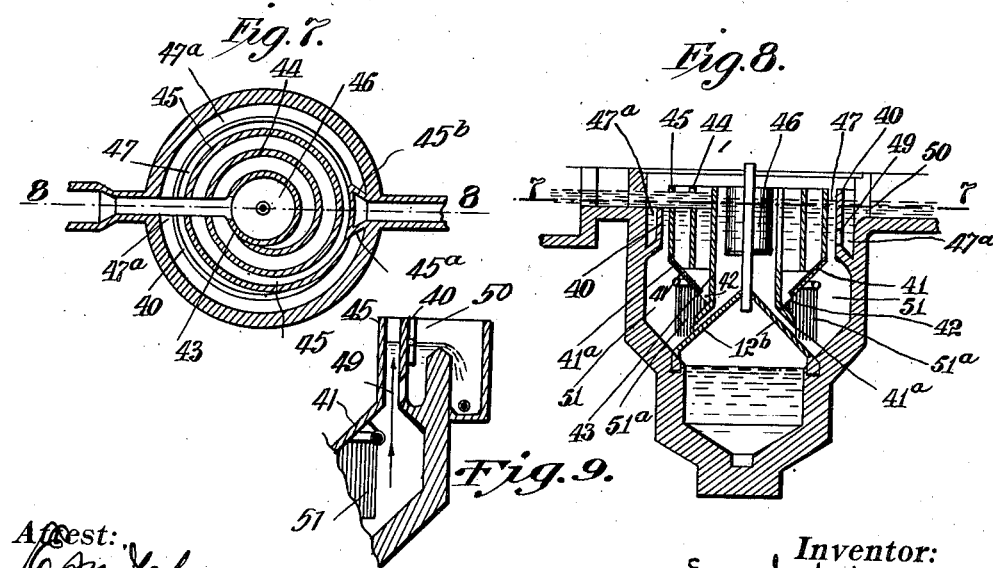

UNITED STATES PATENT OFFICE.

EUGEN SEUBERT, OF MUNICH, GERMANY.

SEWAGE-TANK FOR THE PURIFICATION OF SEWAGE.

1,102,553.                    Specification of Letters Patent.     Patented July 7, 1914.

Application filed November 11, 1912. Serial No. 730,777.

*To all whom it may concern:*

Be it known that I, EUGEN SEUBERT, citizen of Germany, residing at Munich, in the Kingdom of Bavaria, Germany, have invented certain new and useful Improvements in Sewage-Tanks for the Purification of Sewage; and I do hereby declare the following to be a full, clear, and exact description of the invention, such as will enable others skilled in the art to which it appertains to make and use the same.

My invention relates to apparatus for mechanically treating sewage to purify the same prior to its discharge into streams or other points of discharge.

One object of the invention is to provide a compactly constructed apparatus by means of which large quantities of sewage may be efficiently purified within a relatively short space of time.

Another object is to provide simply constructed means for recovering valuable constituents, such as fatty products, from the sewage as the same is being treated in the course of purification.

In its preferred embodiment, an apparatus constructed in accordance with my invention includes a central receiving chamber in communication with a continuous spiral course or way, a sediment chamber lying under the receiving chamber and the spiral course, and a cover over the sediment chamber, which cover forms an inclined floor down which the sediment, freed from the sewage, glides into the sediment chamber. The apparatus also includes certain important details of structure, all of which will be fully hereinafter described.

The invention is illustratively exemplified in the accompanying drawings, wherein—

Figure 1 is a horizontal sectional view, on the line 1—1 of Fig. 2, of a single unit purifying apparatus; Fig. 2 is a vertical sectional view on the line 2—2 of Fig. 1; Fig. 3 is a horizontal sectional view, on the line 3—3 of Fig. 4, of a multiple unit purifying apparatus; Fig. 4 is a vertical sectional view on the line 4—4 of Fig. 3; Fig. 5 is a transverse sectional view on the line 5—5 of Fig. 3; Fig. 6 is a fragmentary sectional view of the cover over the sediment chamber; Fig. 7 is a horizontal sectional view, on the line 7—7 of Fig. 8; of a modified form of the invention containing means for the recovery of fatty substances and like valuable products; Fig. 8 is a vertical sectional view on the line 8—8 of Fig. 7, and Fig. 9 is a sectional detail view on the line 9—9 of Fig. 8.

In all forms of the invention, the sewage to be treated is first fed to a central receiving chamber whence it passes in a continuous spiral course to the outlet, which it reaches in practically pure condition, *i. e.* freed of sediment, fats, and other solid substances. The forms of invention illustrated all disclose a continuous forwardly extending spiral course, but it is to be understood that this form is illustrative merely, and that the course may be serpentine or of other tortuous form, provided that a long course within a relatively small area is provided.

Referring in detail to the drawing, and particularly to Figs. 1 and 2 thereof, 10 denotes an upright casing substantially cylindrical at its upper portion. Intermediate its upper and lower ends, the casing is formed with the converging walls $10^a$, merging into the lower walls $10^b$ between which the sediment chamber 11 is contained. Supported by the walls $10^a$ is a substantially conical platform which serves as a cover for the sediment chamber, as well as the floor of the spiral course through which the sewage passes. The platform comprises similar walls 12, inclined relatively to each other at an angle of substantially forty-five degrees. The apex of the angle projects in a direction away from the sediment chamber 11. The shape of the platform, from end to end or in the direction of its length, is, roughly, saddle-back. Carried by or formed integrally with the platform 12 and the converging walls $10^a$, are convolute partitions $12'$, $12^a$, $12^b$, which in practice are preferably formed as a continuous wall, and between the convolutions of which passages 13, $13^a$, $13^b$, of spiral formation, are provided. The outermost passage $13^b$ leads through a contact filter 14 to the emission passage or tube 15. It is desirable to provide slots or orifices through which the sediment which is precipitated from the sewage may pass into the sediment chamber 11. In certain forms of the invention such slots are provided only at the points where the ends of the walls 12 are in proximity to the walls $10^a$, the lower ends of the partitions $12'$, $12^a$, $12^b$, being slotted to allow the sediment to pass therethrough, while in other forms of the invention, *e. g.* that shown in Fig. 4, I may provide adjacent the lower end of each of the partitions 12', 12ª, 12ᵇ, a slot through the wall 12 so that the sediment may fall into the chamber 11. The first of these forms is preferably employed when sewage which does not readily putrify is being treated, while the second form is used in cases when easily putrifiable sewage is treated, in order that the solid putrifiable matter may be freed from the liquid as quickly as possible. Fig. 2 shows a form of device wherein the walls 12 are slotted only at points adjacent the walls 10ª, while the lower ends of the vertical partitions 12', 12ª, 12ᵇ, are slotted at 19 to allow the sediment to glide down the inclined walls 12, and pass through the slots in the walls 12 into the chamber 11. The preferred manner of anchoring the platform 12 to the walls 10ª consists in embedding iron girders or pedestals 16 in the walls 10ª (which are preferably of concrete or other suitable masonry), and securing to the lower edges of the walls 12 angle iron bars 17 which are suitably bolted to the girders 16. The continuity of the girders 16 is interrupted at suitable intervals to provide between the same and the angle irons 17 annular spaces or slots 18 through which the sediment issues into chamber 11. It will be noted that the slots 18 are spaced away from the upper ends of the walls 10ᵇ a sufficient distance to prevent any sediment which may rise in the chamber 11 from entering and choking these slots.

In Figs. 4, 5 and 6, the walls 12 are shown as being provided with a plurality of series of slots 17', and extending adjacent each of these series of slots is an angle bar 17 having a depending edge or flange 17ª projecting toward the chamber 11, and which flanges 17ª serve to deflect the sediment into this chamber. The sewage is admitted to the apparatus through an inlet conduit or pipe 20, the inner end of which opens into the central sewage receiving chamber 21. This receiving chamber is substantially of annular shape and is inclosed by the convolutions of the vertical walls or partitions 12', 12ª, and 12ᵇ between which the spiral course for the sewage is formed. The receiving chamber 21 is provided with a wide outlet 22, extending vertically beyond the normal water level. The outlet 22 is preferably formed of vertical rods or bars which act as a trap to hold back solid particles in the sewage. From the outlet 22 the sewage enters and passes through the spiral course, a continuous horizontal centrifugal action being assured by the constant supply of sewage flowing to the receiving chamber 21 through the inlet pipe 20. Gases are given off from the sediment which ultimately reaches the sediment chamber 11, and to provide for the escape of such gases I employ one or more vent pipes 23, open at both ends, the lower end communicating with the interior of chamber 11 and the upper end opening into atmosphere.

The structural features of the multiple unit settling tank shown in Figs. 3, 4 and 5 substantially correspond with those of the single unit device of Figs. 1 and 2. In the multiple unit structure the course is an elliptical spiral, the sewage entering through a common inlet 20ª and then passing by way of the branch pipes 20ᵇ to the receiving chamber 21ª. From each receiving chamber 21ª the sewage flows through the outlet 22ª into the elliptical spiral course 23', 24', 25' and out through the common outlet 26. The gas vent pipes 23 are provided to permit the outflow of gas from chamber 11ª, and 27 designates shafts through which the accumulated material may be removed from the chamber 11ª.

In Figs. 7, 8, and 9 I have shown a modified structure, which is employed when it is desired to recover fatty constituents from the sewage. In these figures the structure and shape of the exterior casing, the platform walls, the central receiving chamber and the inlet for the sewage are the same as shown in Figs. 1 and 2, and the description thereof does not require repetition. The structure of the central receiving chamber, of the spiral courses around the same, and of the outlet is somewhat modified in Figs. 7, 8 and 9 and will now be described.

Extending from a point near the upper end of each of the platform walls 12ᵇ, to the bottom of the outermost of the walls between which the spiral course is formed, concentric with the upper part of the casing of the tank, is a supporting wall 41 these walls converging at their lower ends and each being inclined from the platform walls 12ᵇ at an angle of approximately forty-five degrees. Upon the supporting walls 41 rest the vertical partitions between which the spiral course or raceway for the sewage is formed. The walls 41 are perforated or slotted at 42, and mounted thereon are the vertical convolute partitions 43, 44, 45, at the center of which the receiving chamber 46 is provided and between the convolutions of the others of which the sewage travels in a spiral path. Between the outer periphery of the partition 45 and the inner periphery of a wall 40 carried interiorly by and parallel to the casing of the device an annular fat collecting channel 47 is formed, which channel is open at both its upper and lower ends. Throughout the greater portion of its length the height of the wall 40 is less than that of the partitions 43, 44 and 45, but that portion of the wall 40 which lies between the inclined wall sections 45ª and 45ᵇ which guide the water to the outlet, is equal in height to these partitions. The purpose of this construction is to have the higher portion of the wall 40 prevent the discharge of the fatty substances flowing on top of the water. Near its lower end or edge the higher part of the annular wall 40 is provided with an outlet opening 49 at a slightly lower lever than the upper surface of the outlet 50 of the entire settling tank. Surrounding the fat collecting channel 47 is the annular fat receiving chamber 47ª. Below the walls 41 is formed an intermediate chamber 51, said intermediate chamber being bounded by the walls 41 and 12ᵇ, and depending into the intermediate chamber from the lower surfaces of the walls 41 is a swinging grid consisting of a plurality of spaced, pivotally supported rods or bars 51ª, the lower ends of which are spaced somewhat from the lower ends of the platform walls 12ᵇ.

In the form of invention shown in Figs. 7, 8, and 9 the operation is as follows:—The sewage passes through the inlet pipe or conduit to the central receiving chamber 46 and as in the other forms of invention, is forced to flow centrifugally in a horizontal spiral path through the several courses of the raceway. The process of separating out the grease and sediment from the liquid portion of the sewage proceeds simultaneously in two directions. The process commences in the receiving chamber 46, out of which a part of the sediment passes through the openings 41ª in the walls 12ᵇ and into the chamber 51. As the sewage passes out of the chamber 46 into the spiral course between the vertical partitions, the grease being specifically the lightest portion floats on top, and the sediment passes through the orifices 42 into the chamber 51. The fluid with the grease floating on its surface is driven forward by the constant inflow to the chamber 46, and ultimately the grease enters the grease collecting channel 47 and passes thence into the receiving chamber 47ª by flowing over the upper edge of the lower part of the wall 40 into this chamber. The sediment entering the chamber both from the receiving chamber 46 and from the spiral course is retarded by the swinging grid 51ª. The water flowing against this grid causes it to swing or oscillate, by which action it presses and agitates the sediment behind it. The sediment thus gives up its grease constituent which rises to the top of the liquid and flows up through the open bottom of the channel 47 into the latter and thence over wall 40 into the receiving chamber 47ª. Owing to the position and form of the escape opening 49 (Fig. 9) in the wall 40, water below the normal water level may flow off to the discharge 50, but the grease on top of the water in chamber 47ª remains entrained and may be easily removed.

Having now described my invention, what I claim as new and desire to secure by Letters Patent is:—

1. An apparatus for treating sewage, embodying a casing having a sediment chamber in its base, an inclined cover over said chamber, a sewage receiving chamber on said cover arranged approximately centrally of said casing, a sinuous course or raceway extending continuously from said receiving chamber to the periphery of said casing, and means for feeding sewage to said receiving chamber.

2. An apparatus for treating sewage, embodying a casing having a sediment chamber in its base, an inclined cover over said chamber provided with openings for the passage of sediment into said chamber, a sewage receiving chamber on said cover arranged approximately centrally of said casing, a sinuous course or raceway in communication with said receiving chamber and extending continuously therefrom to the periphery of said casing, and means for feeding sewage to said receiving chamber.

3. An apparatus for treating sewage, embodying a casing having a sediment chamber in its base and its walls inclined above said sediment chamber, an inclined cover over said chamber and having its lower edges terminating near the lower ends of said inclined walls, a sewage receiving chamber on said cover arranged approximately centrally of said casing, a sinuous course or raceway extending continuously from said receiving chamber to the periphery of said casing, and means for feeding sewage to said receiving chamber.

4. An apparatus for treating sewage, embodying a casing having a sediment chamber in its base, an inclined cover over said chamber, a plurality of curved vertical partitions on said cover, said partitions having formed therebetween a central sewage receiving chamber and a continuous couse or raceway extending from said receiving chamber to the periphery of said casing, and means for feeding sewage to said sewage receiving chamber.

5. An apparatus for treating sewage, embodying a casing having a sediment chamber in its base, an inclined cover over said chamber, brackets or pedestals carried by the walls of said casing, angle iron bars carried by the lower edges of said cover and connected to said pedestals to provide orifices through which sediment may pass into said sediment chamber, a sewage receiving chamber on said cover arranged approximately centrally of said casing, a sinuous course or raceway extending continuously from said receiving chamber to the periphery of said casing, and means for feeding sewage to said sewage receiving chamber.

6. An apparatus for treating sewage, embodying a casing having a sediment chamber in its base, an inclined cover over said chamber, means for firmly anchoring the cover to the casing leaving orifices between said cover and said casing through which orifices sediment may pass into said chamber, a sewage receiving chamber on said cover arranged approximately centrally of said casing, a sinuous course or raceway communicating with said sewage receiving chamber and extending continuously therefrom to the periphery of said casing and means for feeding sewage to said sewage receiving chamber.

7. An apparatus for treating sewage, embodying a casing having a sediment chamber in its base, a conical cover over said chamber, a sewage receiving chamber on said cover arranged approximately centrally of said casing, a sinuous course or raceway extending continuously from said sewage receiving chamber to the periphery of said casing, means for feeding sewage to said sewage receiving chamber, and means for recovering fatty products from the sewage.

8. An apparatus for treating sewage, embodying a casing having a sediment chamber in its base, a conical cover over said chamber, a sewage receiving chamber on said cover arranged approximately centrally of said casing, a sinuous course or raceway extending continuously from said sewage receiving chamber to the periphery of said casing, means for feeding sewage to said sewage receiving chamber, and means for recovering fatty products from the sewage, said last named means including a channel surrounding the outermost portion of said course or raceway.

9. An apparatus for treating sewage, embodying a casing having a sediment chamber in its base, a conical cover over said chamber, a sewage receiving chamber on said cover arranged approximately centrally of said casing, a sinuous course or raceway extending continuously from said sewage receiving chamber to the periphery of said casing, means for feeding sewage to said sewage receiving chamber, and means for recovering fatty products from the sewage, said last named means including a collecting channel and receiving chamber surrounding said course or raceway and interposed between the same and the periphery of said casing.

10. An apparatus for treating sewage, embodying a casing having a sediment chamber in its base, a conical cover over said chamber, a sewage receiving chamber on said cover arranged approximately centrally of said casing, a sinuous course or raceway extending continuously from said sewage receiving chamber to the periphery of said casing, means for feeding sewage to said sewage receiving chamber, means for recovering fatty products from the sewage, said last named means including a channel surrounding the outermost portion of said course or raceway, and means whereby fluid is permitted to escape from said casing and fatty products floating on said fluid are retained in said casing.

In testimony whereof I hereunto affix my signature in the presence of two witnesses.

EUGEN SEUBERT.

Witnesses:
MATHILDE K. HELD,
JOHANNA STERN.